US009300770B2

(12) United States Patent
Nabata et al.

(10) Patent No.: US 9,300,770 B2
(45) Date of Patent: Mar. 29, 2016

(54) ELECTRONIC DEVICE

(71) Applicant: KYOCERA Corporation, Kyoto (JP)

(72) Inventors: Toshihisa Nabata, Sagamihara (JP);
Tomoaki Miyano, Kameyama (JP);
Satoshi Mizuta, Sagamihara (JP);
Kiyokazu Sato, Yokohama (JP); Akio Kihara, Kawasaki (JP); Shun Kazama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 107 days.

(21) Appl. No.: 13/860,150

(22) Filed: Apr. 10, 2013

(65) Prior Publication Data

US 2013/0267278 A1    Oct. 10, 2013

(30) Foreign Application Priority Data

Apr. 10, 2012    (JP) ................. 2012-089203

(51) Int. Cl.
*H04M 1/00*    (2006.01)
*H04M 1/02*    (2006.01)
*H04M 19/04*    (2006.01)

(52) U.S. Cl.
CPC ............ *H04M 1/026* (2013.01); *H04M 19/047* (2013.01)

(58) Field of Classification Search
CPC .................................................... H04M 1/026
USPC ......... 455/566, 575.1, 575.2, 569.1; 345/156, 345/173
See application file for complete search history.

(56) References Cited

U.S. PATENT DOCUMENTS

| 3,728,741 | A | 4/1973 | Lepor |
| 6,259,188 | B1 * | 7/2001 | Woodard et al. .............. 310/330 |
| 6,427,017 | B1 | 7/2002 | Toki |
| 7,050,600 | B2 * | 5/2006 | Saiki et al. .................... 381/388 |
| 7,174,025 | B2 | 2/2007 | Azima et al. |
| 7,421,088 | B2 | 9/2008 | Cranfill et al. |
| 7,499,731 | B2 * | 3/2009 | Engstrom et al. ............. 455/566 |
| 7,512,425 | B2 | 3/2009 | Fukuda |
| 7,657,042 | B2 | 2/2010 | Miyata |
| 8,199,959 | B2 | 6/2012 | Miyata |
| 8,200,289 | B2 | 6/2012 | Joo et al. |
| 8,279,623 | B2 | 10/2012 | Idzik et al. |

(Continued)

FOREIGN PATENT DOCUMENTS

| EP | 1542064 A1 | 6/2005 |
| EP | 2793483 A1 | 10/2014 |

(Continued)

OTHER PUBLICATIONS

An Office Action issued by the Japanese Patent Office on Aug. 28, 2012, which corresponds to Japanese Patent Application No. 2012-148834 and is related to U.S. Appl. Nos. 14/002,357 and 13/860,150.

(Continued)

*Primary Examiner* — Sanh Phu
(74) *Attorney, Agent, or Firm* — Studebaker & Brackett PC

(57) ABSTRACT

The electronic device including a piezoelectric element, a vibration plate having the piezoelectric element fixed thereto for generating air conduction sound by vibrating the piezoelectric element and sound to be transmitted by vibrating a part of a human body, a housing having the vibration plate fixed thereto, and an operation key provided to the housing, makes vibration of the vibration plate not likely to be transmitted to the operation key.

14 Claims, 7 Drawing Sheets

(56) References Cited

U.S. PATENT DOCUMENTS

| | | | |
|---|---|---|---|
| 8,848,967 | B2 | 9/2014 | Joo |
| 2001/0026625 | A1 | 10/2001 | Azima et al. |
| 2002/0065113 | A1 | 5/2002 | Mori |
| 2002/0067841 | A1 | 6/2002 | Bank et al. |
| 2002/0076061 | A1 | 6/2002 | Ashtiani et al. |
| 2004/0109571 | A1* | 6/2004 | Yoshimine ............... 381/67 |
| 2005/0002537 | A1 | 1/2005 | Azima et al. |
| 2005/0057527 | A1 | 3/2005 | Takenaka et al. |
| 2005/0129267 | A1 | 6/2005 | Azima et al. |
| 2005/0169112 | A1 | 8/2005 | Shimizu |
| 2006/0093165 | A1 | 5/2006 | Kamimura et al. |
| 2006/0140424 | A1 | 6/2006 | Kobayashi |
| 2006/0227981 | A1 | 10/2006 | Miyata |
| 2006/0286998 | A1 | 12/2006 | Fukuda |
| 2007/0057909 | A1 | 3/2007 | Schobben et al. |
| 2007/0097073 | A1* | 5/2007 | Takashima et al. .......... 345/156 |
| 2008/0268921 | A1 | 10/2008 | Taniguchi et al. |
| 2009/0103767 | A1 | 4/2009 | Kuroda et al. |
| 2009/0147969 | A1 | 6/2009 | Kinouchi et al. |
| 2009/0290746 | A1 | 11/2009 | Miyata |
| 2009/0296976 | A1 | 12/2009 | Tsai et al. |
| 2010/0225600 | A1* | 9/2010 | Dai et al. .................. 345/173 |
| 2010/0278362 | A1 | 11/2010 | Kim |
| 2011/0234459 | A1 | 9/2011 | Yabe |
| 2012/0063074 | A1 | 3/2012 | Matsuda et al. |
| 2012/0172072 | A1* | 7/2012 | Baxter et al. ................. 455/500 |
| 2013/0051585 | A1 | 2/2013 | Karkkainen et al. |
| 2013/0308798 | A1 | 11/2013 | Lee |
| 2014/0342783 | A1 | 11/2014 | Suzuki et al. |
| 2015/0023531 | A1 | 1/2015 | Horii et al. |

FOREIGN PATENT DOCUMENTS

| | | |
|---|---|---|
| JP | S62-86799 U | 6/1987 |
| JP | H07-296786 A | 11/1995 |
| JP | H08-223675 A | 8/1996 |
| JP | H09-247795 A | 9/1997 |
| JP | H11-25940 A | 1/1999 |
| JP | 2001-007546 A | 1/2001 |
| JP | 2002-027065 A | 1/2002 |
| JP | 2002-185593 A | 6/2002 |
| JP | 2002-219413 A | 8/2002 |
| JP | 2002-232542 A | 8/2002 |
| JP | 2002-305569 A | 10/2002 |
| JP | 2004-187031 A | 7/2004 |
| JP | 2005-214793 A | 8/2005 |
| JP | 2005-236352 A | 9/2005 |
| JP | 2005-284054 A | 10/2005 |
| JP | 2005-348193 A | 12/2005 |
| JP | 2007-502594 A | 2/2007 |
| JP | 2007-082009 A | 3/2007 |
| JP | 2007-180827 A | 7/2007 |
| JP | 2007-189578 A | 7/2007 |
| JP | 2008-017398 A | 1/2008 |
| JP | 2008-270879 A | 11/2008 |
| JP | 2009-118396 A | 5/2009 |
| JP | 2011-091719 A | 5/2011 |
| JP | 2013-110535 A | 6/2013 |
| JP | 5255142 B1 | 8/2013 |
| JP | 2013-207795 A | 10/2013 |
| JP | 2013-207796 A | 10/2013 |
| JP | 2013-223238 A | 10/2013 |
| JP | 2013-232874 A | 11/2013 |
| JP | 2013-255212 A | 12/2013 |
| KR | 10-1068254 B1 | 9/2011 |
| WO | 2004/023199 A1 | 3/2004 |
| WO | 2004/051967 A1 | 6/2004 |
| WO | 2006/059679 A1 | 6/2006 |
| WO | 2006/114985 A1 | 11/2006 |
| WO | 2012/025783 A1 | 3/2012 |

OTHER PUBLICATIONS

An Office Action issued by the Japanese Patent Office on Feb. 5, 2013, which corresponds to Japanese Patent Application No. 2012-148834 and is related to U.S. Appl. Nos. 14/002,357 and 13/860,150.

An Office Action issued by the Japanese Patent Office on Apr. 23, 2013, which corresponds to Japanese Patent Application No. 2012-148834 and is related to U.S. Appl. Nos. 14/002,357 and 13/860,150.

An Office Action issued by the Japanese Patent Office on Aug. 26, 2014, which corresponds to Japanese Patent Application No. 2014-016081 and is related to U.S. Appl. Nos. 14/002,357 and 13/860,150.

An Office Action issued by the Japanese Patent Office on Aug. 26, 2014, which corresponds to Japanese Patent Application No. 2014-016048 and is related to U.S. Appl. Nos. 14/002,668 and 13/860,150.

An Office Action issued by the Japanese Patent Office on Jul. 31, 2012, which corresponds to Japanese Patent Application No. 2012-148844 and is related to U.S. Appl. Nos. 14/002,668 and 13/860,150.

An Office Action issued by the Japanese Patent Office on Jan. 8, 2013, which corresponds to Japanese Patent Application No. 2012-148844 and is related to U.S. Appl. Nos. 14/002,668 and 13/860,150.

An Office Action issued by the Japanese Patent Office on Jul. 31, 2012, which corresponds to Japanese Patent Application No. 2012-148798 and is related to U.S. Appl. Nos. 14/002,675 and 13/860,150.

An Office Action issued by the Japanese Patent Office on Jan. 8, 2013, which corresponds to Japanese Patent Application No. 2012-148798 and is related to U.S. Appl. Nos. 14/002,675 and 13/860,150.

An Office Action issued by the Japanese Patent Office on Apr. 23, 2013, which corresponds to Japanese Patent Application No. 2012-148798 and is related to U.S. Appl. Nos. 14/002,675 and 13/860,150.

An Office Action issued by the Japanese Patent Office on Jul. 31, 2012, which corresponds to Japanese Patent Application No. 2012-148773 and is related to U.S. Appl. Nos. 14/002,699 and 13/860,150.

An Office Action issued by the Japanese Patent Office on Jan. 8, 2013, which corresponds to Japanese Patent Application No. 2012-148773 and is related to U.S. Appl. Nos. 14/002,699 and 13/860,150.

An Office Action issued by the Japanese Patent Office on Jul. 31, 2012, which corresponds to Japanese Patent Application No. 2012-148809 and is related to U.S. Appl. Nos. 14/002,698 and 13/860,150.

An Office Action issued by the Japanese Patent Office on Jan. 8, 2013, which corresponds to Japanese Patent Application No. 2012-148809 and is related to U.S. Appl. Nos. 14/002,698 and 13/860,150.

International Search Report; PCT/JP2013/002789; issued on Jun. 11, 2013, which corresponds to U.S. Appl. Nos. 14/002,357 and 13/860,150.

International Search Report; PCT/JP2013/002088; issued on May 14, 2013, which corresponds to U.S. Appl. Nos. 14/002,668 and 13/860,150.

International Search Report; PCT/JP2013/002530; issued on May 14, 2013, which corresponds to U.S. Appl. Nos. 14/002,675 and 13/860,150.

International Search Report; PCT/JP2013/002874; issued on Jun. 11, 2013, which corresponds to U.S. Appl. Nos. 14/002,699 and 13/860,150.

International Search Report; PCT/JP2013/002138; issued on May 14, 2013, which corresponds to U.S. Appl. Nos. 14/002,698 and 13/860,150.

The extended European search report issued by the European Patent Office on Jun. 11, 2013, which corresponds to European Patent Application No. 13163442.0 and is related to U.S. Appl. Nos. 13/862,333 and 13/860,150.

An Office Action; "Notice of Reasons for Rejection," issued by the Japanese Patent Office on Dec. 2, 2014, which corresponds to Japanese Patent Application No. 2014-016082 and is related to U.S. Appl. Nos. 14/002,675 and 13/860,150; with English language concise explanation.

An Office Action; "Notice of Reasons for Rejection," issued by the Japanese Patent Office on Dec. 2, 2014, which corresponds to Japanese Patent Application No. 2014-016046 and is related to U.S. Appl. Nos. 14/002,698 and 13/860,150; with English language concise explanation.

The extended European search report issued by the European Patent Office on Jul. 30, 2015, which corresponds to European Patent Application No. 13767862.9-1972 and is related to U.S. Appl. Nos. 14/807,865 and 13/860,150.

(56) References Cited

OTHER PUBLICATIONS

An Office Action; "Notice of Reasons for Rejection," issued by the Japanese Patent Office on Mar. 17, 2015, which corresponds to Japanese Patent Application No. 2014-016048 and is related to U.S. Appl. Nos. 14/002,668 and 13/860,150; with English language concise explanation.

An Office Action; "Notice of Reasons for Rejection," issued by the Japanese Patent Office on Mar. 24, 2015, which corresponds to Japanese Patent Application No. 2012-091021 and is related to U.S. Appl. Nos. 13/862,333 and 13/860,150; with English language concise explanation.

The extended European search report issued by the European Patent Office on Aug. 5, 2015, which corresponds to European Patent Application No. 13780570.1-1910 and is related to U.S. Appl. Nos. 14/002,699 and 13/860,150.

An Office Action; "Notice of Reasons for Rejection," issued by the Japanese Patent Office on Feb. 10, 2015, which corresponds to Japanese Patent Application No. 2012-089203 and is related to U.S. Appl. No. 13/860,150; with English language concise explanation.

\* cited by examiner

ELECTRONIC DEVICE

CROSS REFERENCE TO RELATED APPLICATION

This application claims priority to and the benefit of Japanese Patent Application No. 2012-089203 (filed on Apr. 10, 2012), the entire content of which is incorporated herein by reference.

FIELD

The embodiments discussed herein relate to an electronic device that, by vibrating a panel by applying a predetermined electric signal (sound signal) on a piezoelectric element, transmits the vibration of the panel through a human body such that sound is transmitted to a user.

BACKGROUND

Patent document 1 listed below describes an electronic device such as a mobile phone that transmits the air conduction sound and bone conduction sound to the user. Patent document 1 also describes that the air conduction sound is sound transmitted to the auditory nerve of the user as vibration of the air caused by vibration of an object is transmitted to the eardrum through the ear canal and vibrates the eardrum. Patent document 1 further describes that the human body vibration sound is sound transmitted to the auditory nerve of the user through a part of the body (for example, the cartilage of the external ear) of the user in contact with a vibrating object.

Patent Document 1 describes a telephone equipment having a vibrator in a corrugated plate shape constituted by using a piezoelectric bimorph and a flexible substance attached to an external surface of a housing via an elastic member. Patent document 1 also describes that, when a voltage is applied on the piezoelectric bimorph of the vibrator, the vibrator vibrates in a curved manner as piezoelectric material expands and contracts in a longitudinal direction and the air conduction sound and the human body vibration sound are transmitted to the user when the user contacts the vibrator to the auricle.

PATENT DOCUMENT

Patent Document 1: Japanese Patent Laid-Open No. 2005-348193

SUMMARY

The electronic device according to Patent Document 1 includes the vibrator attached to the external surface of the housing of a mobile phone and the like. Therefore, consideration is barely made for a case that a panel attached to the housing is vibrated.

In the embodiments discussed herein, an electronic device that may be appropriately used as an electronic device for vibrating the panel attached to the housing is provided.

An electronic device according to one embodiment includes a piezoelectric element, a vibration plate having the piezoelectric element fixed thereto for generating sound by vibrating a part of a human body as vibrated by the piezoelectric element, a housing having the vibration plate fixed thereto, and an operation key provided to the housing. The vibration plate may further generate air-conducted sound.

The piezoelectric element is fixed closer to a first end of the vibration plate in a planar view. The operation key may be provided closer to a second end of the housing, opposite to the first end of the vibration plate in the planar view.

The electronic device may further include a display unit fixed in an area between the piezoelectric element fixed to the vibration plate and the second end.

The piezoelectric element may be fixed to the vibration plate at a position outside an area of the vibration plate overlapping with the display unit in the planar view.

The operation key may be inserted into an opening provided on the housing.

A length of a second direction from a side where the piezoelectric element is fixed to the vibration plate in the planar view to the other side may be equal to or longer than a length between the antitragus and the inferior antihelix crus.

A length in a direction crossing the second direction of the vibration plate in the planar view may be equal to or longer than a length between the tragus and the antihelix.

The piezoelectric element may be attached and fixed to the vibration plate by using a joint member.

The joint member may be non-heating type hardening adhesive.

The joint member may be a double-sided tape.

The vibration plate may be attached to the housing by using the joint member.

The joint member may be the non-heating type hardening adhesive.

The joint member may be the double-sided tape.

The vibration plate may constitute any of or all of the display unit, an input unit, a display unit cover and a battery cover for allowing removal of a battery.

DESCRIPTION OF EMBODIMENTS

According to embodiments herein, the electronic device that vibrates the panel attached to the housing may be appropriately used.

Figure 1:
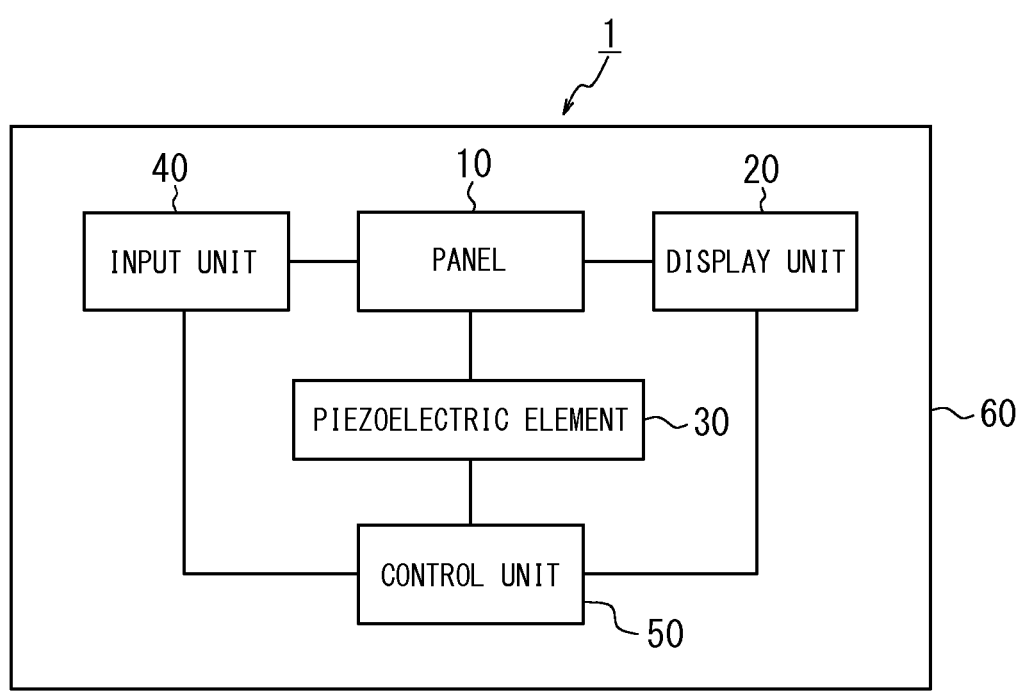
FIG. 1 is a functional block diagram illustrating an electronic device according to one embodiment.

Embodiments will be described in detail with reference to the accompanying drawings. FIG. 1 is a diagram illustrating a functional block of an electronic device 1 according to one embodiment. The electronic device 1 is, for example, a mobile phone (smart phone) and includes a panel 10, a display unit 20, a piezoelectric element 30, an input unit 40 and a control unit 50. The panel 10 serves as an example of a "vibration plate" according to the present embodiment. In the present embodiment, the electronic device 1 functions as a mobile phone such that the piezoelectric element 30 causes vibration of the panel 10, thereby sound transmitted through a human body is generated. The sound transmitted through a human body (or, human body vibration sound) vibrates the middle ear or the inner year through soft tissues (for example, the cartilage). A configuration of the electronic device 1 will be described below in detail. The electronic device 1 includes a housing 60 having the panel 10 fixed thereto containing the display unit 20, the piezoelectric element 30, the input unit 40 and the control unit 50.

The panel 10 is a touch panel for detecting a contact or a cover panel for protecting the display unit 20. The panel 10 is made of, for example, the glass or synthetic resin such as acrylic. Preferably, the panel 10 is in a plate shape. Or, the panel 10 may be a flat plate or a curved panel having a smoothly sloping surface. When the panel 10 is the touch panel, the panel 10 detects a contact by a user's finger, a pen or a stylus pen. The touch panel may be any of a capacitive type, a resistive film type, a surface acoustic wave type (or an ultrasonic type), an infrared type, an electromagnetic type, a load detection type and the like.

The display unit 20 is a display device such as a liquid crystal display, an organic EL display, an inorganic EL display or the like. The display unit 20 is provided to a rear face of the panel 10. The display unit 20 is disposed on the rear face of the panel 10 by using a joint member (for example, adhesive). The display unit 20 may be disposed separately from the panel 10 supported by the housing of the electronic device 1.

The piezoelectric element 30 is an element that, when an electronic signal (a voltage) is applied thereon, expands and contracts, or curls, according to an electromechanical coupling coefficient of constituting material. The element may be made of, for example, ceramic or crystal. The piezoelectric element 30 may be a unimorph, a bimorph or a laminated piezoelectric element. The laminated piezoelectric element includes a laminated bimorph element having laminated bimorph (in 16 layers or 24 layers, for example). The laminated piezoelectric element has a laminated structure constituted by using a plurality of dielectric layers including, for example, PZT (lead zirconate titanate) and electrode layers arranged between the plurality of dielectric layers. Upon application of the electric signal (voltage), the unimorph expands and contracts, and the bimorph bends.

The piezoelectric element 30 is disposed on the rear face of the panel 10 (on an inner surface of the electronic device 1). The piezoelectric element 30 is attached to the panel 10 by using a joint member (for example, a double-sided tape). Or, the piezoelectric element 30 may be attached to the panel 10 via an intermediate member (for example, a plate). The piezoelectric element 30 is disposed on the rear face of the panel 10 separated from an inner surface of the housing 60 by a predetermined distance. Preferably, the piezoelectric element 30 is separated from the inner surface of the housing 60 by the predetermined distance when expands and contracts, or bends, as well. That is, the distance between the piezoelectric element 30 and the inner surface of the housing 60 is preferably larger than a maximum deformation amount of the piezoelectric element 30.

The input unit 40 receives an input operation from a user and constituted by using, for example, an operation button (operation key). When the panel 10 is the touch panel, the panel 10 also detects the contact by the user, thereby the input operation by the user is received.

The control unit 50 is a processor for controlling the electronic device 1. The control unit 50 applies a predetermined electric signal (voltage corresponding to an audio signal) on the piezoelectric element 30. The voltage applied on the piezoelectric element 30 by the control unit 50 may be, for example, ±15 V, which is higher than an applied voltage±5 V of a so-called panel speaker aiming conduction of air conduction sound, instead of human body vibration sound. Thereby, when the user presses the panel 10 against a user's body applying a force of 3 N or larger (for example, a force of 5 N to 10 N), the panel 10 may be sufficiently vibrated generating the human body vibration sound through a part of the user's body. The application voltage may be appropriately adjusted based on fixing intensity of the panel 10 to the housing or a support member, or on performance of the piezoelectric element 30.

When the control unit 50 applies the electric signal on the piezoelectric element 30, the piezoelectric element 30 expands and contracts, or bends, in a longitudinal direction. At this time, the panel 10 having the piezoelectric element 30 attached thereto is deformed following expansion and contraction or bend of the piezoelectric element 30 and thus vibrates. The panel 10 flexes by expansion and contraction or bend of the piezoelectric element 30. The panel 10 is directly bent by the piezoelectric element 30. The panel 10 being directly bent by the piezoelectric element 30 differs from a phenomenon adapted to a conventional panel speaker, such that inertia force of a piezoelectric actuator having a piezoelectric element disposed within a case causes vibration added to a certain region of the panel, and thereby the panel is deformed. The panel 10 being directly bent by the piezoelectric element 30 includes a meaning that expansion and contraction or bend (flex) of a piezoelectric element directly bends a panel via a joint member or via a joint member and a below mentioned reinforcement member. Therefore, the panel 10 generates the air conduction sound and, when a part of the user's body contacts the panel 10, generates the human body vibration sound through the part of the body. For example, the control unit 50 may apply an electric signal corresponding to, for example, a sound signal of voice of a person on the other end of call, such that the air conduction sound and the human body vibration sound corresponding to the sound signal are generated. The sound signal may be music including an incoming call melody or a song. The sound signal associated with the electric signal may be based on music data stored in an internal memory of the electronic device 1 or on music data stored in an external server to be played via a network.

The panel 10 vibrates, as well as in an attachment area where the piezoelectric element 30 is attached, an area separated from the attachment area. The panel 10 has a plurality of areas for vibrating in a direction crossing with a principal surface of the panel 10 in a vibration area. In each of the plurality of areas, a value of vibration amplitude changes from plus to minus or vice versa with time. The panel 10 vibrates in such a manner that, at a given moment, parts with relatively large vibration amplitude and parts with relatively small vibration amplitude appear to be randomly distributed over the entire panel 10. That is, a plurality of wave vibrations are detected over the entire panel 10. In order to prevent attenuation of the vibration of the panel 10 described above when the user presses the panel 10 against the user's body at the force of 5 N to 10 N, for example, the control unit 50 may apply a voltage of ±15 V on the piezoelectric element 30. Thereby, the user may hear the sound by contacting the ear to the area separated from the attachment area of the panel 10 described above.

Figure 2:
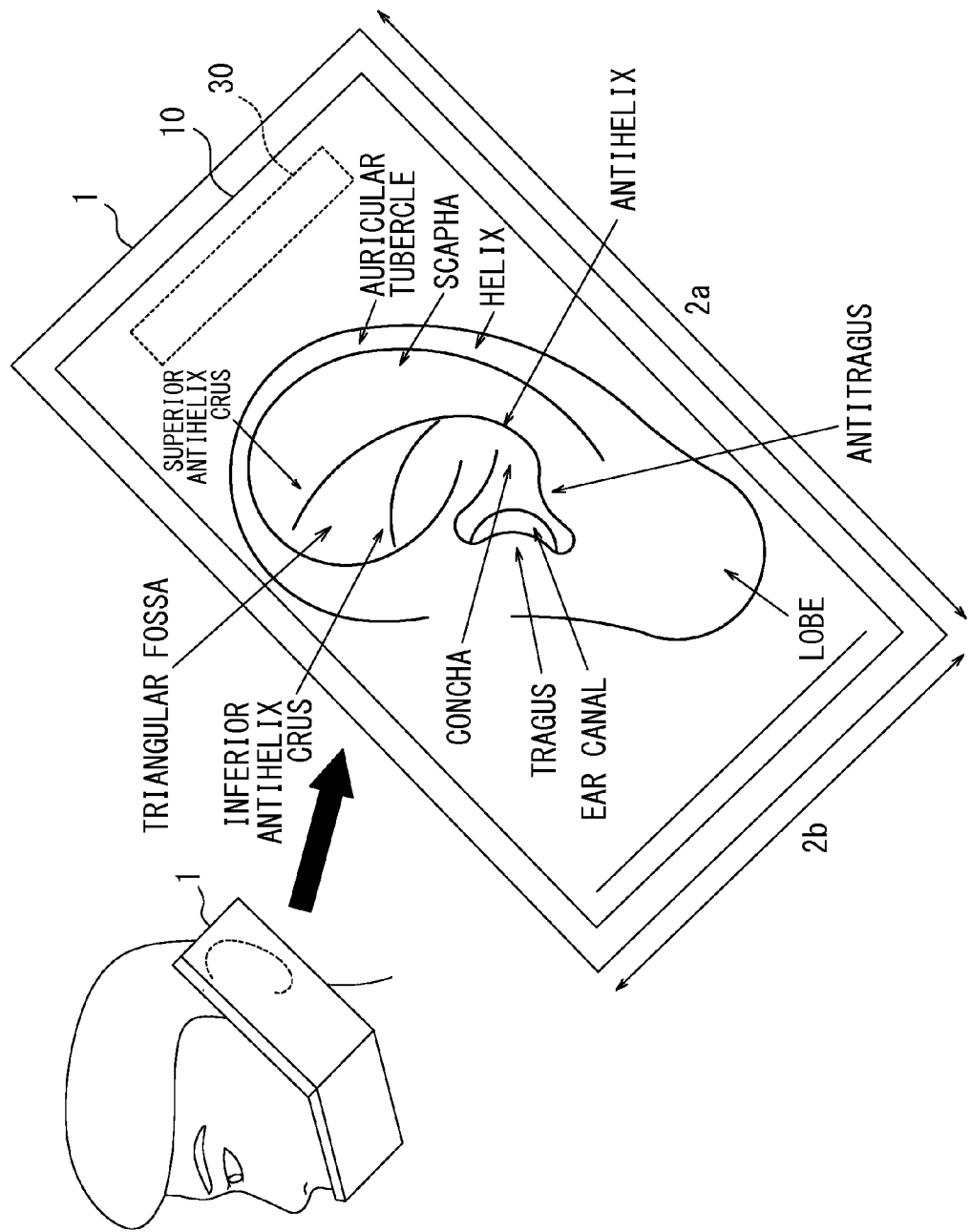
FIG. 2 is a diagram illustrating a panel in a preferred shape.

Here, the panel 10 may be in size approximately similar to the user's ear. Or, as illustrated in FIG. 2, the panel 10 may be larger than the user's ear. In this case, since the entire ear is likely to be covered by the panel 10 of the electronic element 1 when the user listens to the sound, surrounding sound (noises) entering the ear canal may be decreased. The panel 10 vibrates in an area larger than an area having a length corresponding to a distance between the lower antihelix crus (the inferior antihelix crus) and the antitragus and a width corresponding to a distance between the tragus and the antihelix. Preferably, the panel 10 vibrates in an area having a length corresponding to a distance between a part near the upper antihelix crus (the superior antihelix crus) of the helix and the lobe and a width corresponding to a distance between the tragus and a part near the antihelix of the helix. In this example, a length direction corresponds to a longitudinal direction 2a in which the panel 10 stretches, and the piezoelectric element 30 is disposed between a center of the length direction and one end thereof. Also, a width direction corresponds to a direction 2b orthogonal to the longitudinal direction. The area having such length and width may be in a rectangular shape, or in an oval shape having the above length as a long diameter and the above width as a short diameter. An average ear size of Japanese people may be obtained from Database of Japanese Body Size (1992-1994) provided by Research Institute of Human Engineering for Quality Life (HQL). When the panel 10 is equal to or larger than the average ear size of Japanese people, it is considered that the panel 10 may cover most of foreign nationals' entire ears.

Having the size and the shape described above, the panel 10 may cover the user's ear and have an allowance for misalignment relative to the ear.

The electronic device 1 described above, by vibrating the panel 10, may transmit the air conduction sound and the human vibration sound through a part of the user's body (for example, the cartilage of the outer ear). Therefore, when sound at a volume similar to that of a conventional dynamic receiver is output, less sound is transmitted around the electronic device 1 through air vibration due to vibration of the panel 10, in comparison to the dynamic receiver. Accordingly, the electronic device 1 may be preferably used for listening to, for example, a recorded message in a train or the like.

Also, the electronic device 1 described above transmits the human vibration sound by vibrating the panel 10. Therefore, when the user is wearing earphones or headphones, for example, the user may hear the sound via the earphones or the headphones and a part of the user's body by contacting the electronic device 1 to the earphones or the headphones.

The electronic device 1 described above transmits the sound to the user by vibrating the panel 10. Therefore, when the electronic device 1 does not have a separate dynamic receiver, an opening (a sound opening) for transmitting voice does not need to be formed on the housing of the electronic device 1, which enables a simple waterproof structure of the electronic device 1. When the electronic device 1 has the dynamic receiver, the sound opening is preferably sealed with a member that ventilates while blocking liquid. Such a member for ventilating while blocking liquid is, for example, Gore-Tex (registered trademark).

First Embodiment

Figure 3:
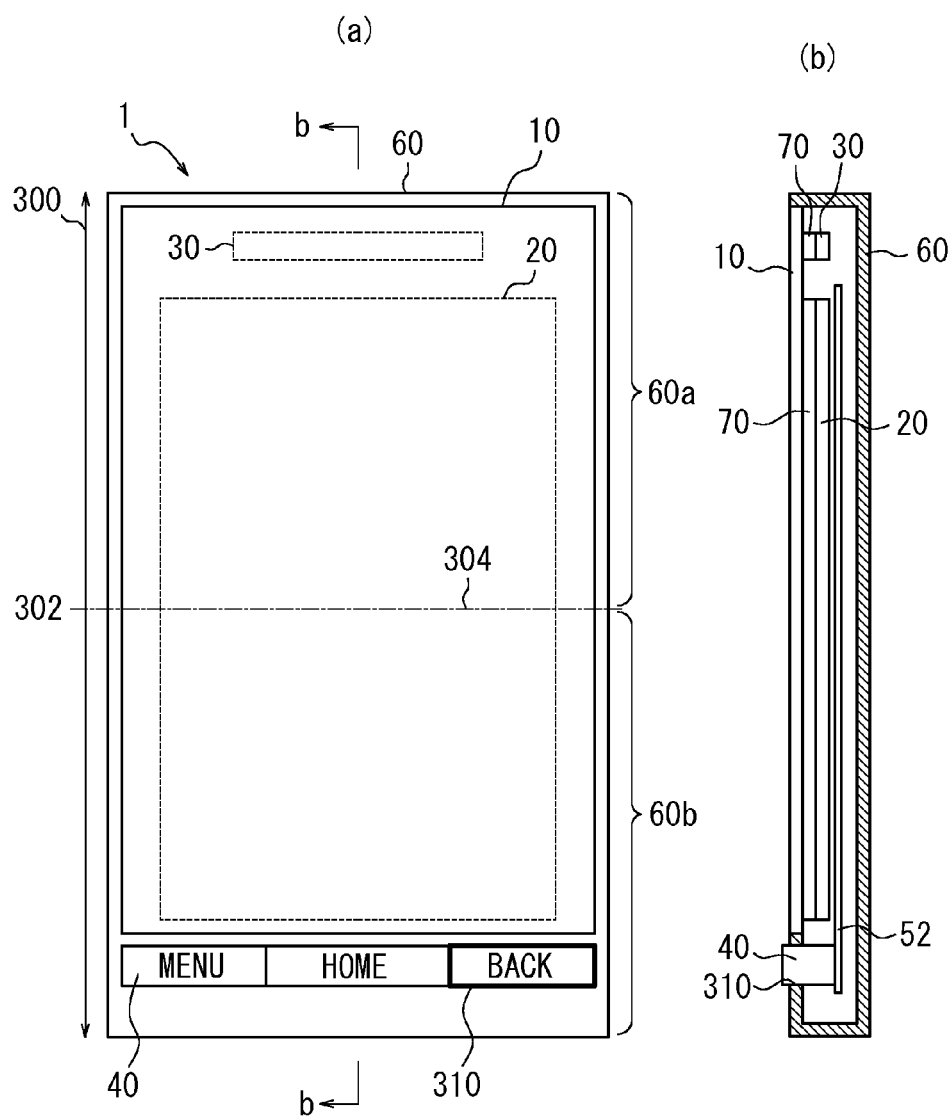
FIGS. 3(a) and 3(b) are diagrams illustrating a housing structure of the electronic device according to a first embodiment.

FIG. 3 illustrates diagrams of a housing structure of the electronic device 1 according to the first embodiment. FIG. 3(a) is a front view, and FIG. 3(b) is a cross-sectional view taken from line b-b of FIG. 3(a). The electronic device 1 illustrated in FIG. 3 is a smart phone having the touch panel constituted by using a glass plate serving as the panel 10 disposed on a front face of a housing 60 (for example, a metallic or resin case). A circuit board 52 having the panel 10, the input unit 40 and the control unit 50 provided thereto is supported by the housing 60. The input unit 40 is an operation key inserted into an opening 310 provided on the housing 60.

The input unit 40 serving as the operation key is a movable input means for generating an input signal from an electric contact generated when pressed down by the user. Therefore, a movable part allows a certain amount of play. However, when the operation key is inserted in an opening of the panel 10, for example, since vibration of the panel 10 generated by the piezoelectric element 30 is transmitted to the operation key, unnecessary noise may be generated as the operation key rattles or voice from the other end may leak outside. According to the present embodiment, as such, the operation key is inserted into the opening 31 provided not on the panel 10 but on the housing 60. Thereby, although some amount of the vibration of the panel 10 is transmitted to the housing 60 through a joint and a contact portion between the panel 10 and the housing 60, the vibration attenuates while passing therethrough, thus influence by the vibration to rattle the operation key may be reduced.

Further, the vibration transmitted through the housing 60 attenuates in proportion to a distance from the piezoelectric element 30 where the vibration is generated. Therefore, when the piezoelectric element 30 is provided on a first end side 60a (at an upper end in FIG. 3) in a longitudinal direction 300 in a planar view of the panel 10 in the rectangular shape, the operation key is provided on a second end side 60b (at a lower end in FIG. 3) opposite to the first end side 60a. Here, the first end side 60a and the second end side 60b are separated from each other by a border 304 stretching in the width direction orthogonal to the longitudinal direction at a center 302 of a length of the longitudinal direction 300. In the planar view, the first end side 60a includes a fixing position of the piezoelectric element 30, and the second end side 60b corresponds to the other side. When the piezoelectric element 30 is disposed across the border 304, the first end side 60a includes a half or more of an area of the piezoelectric element 30, and the second end side 60b corresponds to the other side.

As described above, since the operation key is provided on the lower side 60b of the housing 60, instead of on the upper side 60a where the piezoelectric element 30 is provided, the vibration transmitted to a joint may be reduced more than that when the operation key is provided on the upper side 60a where the piezoelectric element 30 is provided. Thereby, the transmission of the vibration to the operation key may be suppressed more effectively.

Each of the display unit 20 and the piezoelectric element 30 is attached to the panel 10 by a joint member 70. In order to attach the display unit 20 to the panel 10, the joint member 70 is preferably adhesive having a thermosetting property or an ultraviolet curable property such as, for example, an optical elastic resin, which is clear and colorless acrylic ultraviolet curable adhesive. Thereby, the display unit 20 may display various contents through the panel 10. Also, in order to attach the piezoelectric element 30 to the panel 10, the joint member 70 may be adhesive having the thermosetting property or the ultraviolet curable property, or a double-sided tape such as, for example, the optical elastic resin, which is clear and colorless acrylic ultraviolet curable adhesive. Each of the panel 10, the display unit 20 and the piezoelectric element 30 is in approximately rectangular shapes.

The display unit 20 is disposed at approximately the center of the panel 10 in the width direction. The piezoelectric element 30 is disposed at a position separated from an end of the panel 10 in the longitudinal direction by a predetermined distance near the end in such a manner that a longitudinal direction of the piezoelectric element 30 stretches along a short periphery of the panel 10. The display unit 20 and the piezoelectric element 30 are disposed side by side in a direction parallel to the inner surface of the panel 10.

Figure 4:
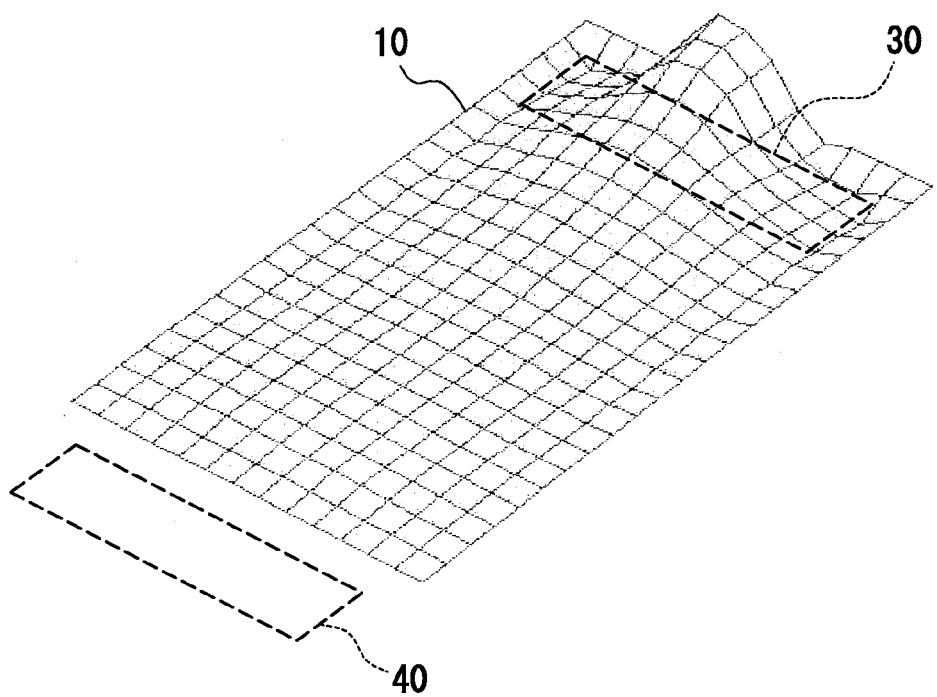
FIG. 4 is a diagram illustrating an example of vibration of the panel of the electronic device according to the first embodiment.

FIG. 4 is a diagram illustrating an example of the vibration of the panel 10 of the electronic device 1 according to the present embodiment. In the electronic device 1 according to the first embodiment, the display unit 20 is attached to the panel 10. Therefore, a lower portion of the panel 10 less vibrates than an upper portion of the panel 10 where the piezoelectric element 30 is attached. Accordingly, sound leakage caused by vibration of the lower portion of the panel 10 may be prevented. The panel 10 is directly bent in its upper portion by the piezoelectric element 30, and vibration is dampened in the lower portion compared to the upper portion. The panel 10 is bent by the piezoelectric element 30 in the direction along the long side of the piezoelectric element 30 such that the portion of the panel 10 immediately above the piezoelectric element 30 rises higher than the adjacent portions. Also, since the display unit 20 is disposed between the piezoelectric element 30 attached to the panel 10 and the input unit 40 serving as the operation key provided to the housing 60, vibration may be efficiently attenuated in a path through which the vibration is transmitted from the piezoelectric element 30 to the input unit 40 via a contact of the lower portion of the panel 10 and the housing 60. Thereby, rattling of the input unit 40 serving as the operation key may be prevented.

According to the electronic device 1 of the present embodiment, also, the panel 10 is deformed due to deformation of the piezoelectric element 30 attached to a rear face of the panel 10, thereby the air conduction sound and the human body vibration sound are transmitted to an object in contact with the panel 10 being deformed. Accordingly, since the air conduction sound and the human body vibration sound may be transmitted to the user without a vibration body protruding to an outer surface of the housing 60, usability is improved more than the electronic device described in Patent Document 1 which requires contact of a vibration body, which is much smaller than the housing, to the human body. Also, since the user does not need to hold the piezoelectric element against the user's ear, the piezoelectric element 30 is not likely to be damaged. Moreover, when the panel 10 is vibrated, the user is not likely to drop the terminal in comparison to when the housing 60, instead of the panel 10, is deformed to generate vibration.

The piezoelectric element 30 is attached to the panel 10 by the joint member 70. Accordingly, the piezoelectric element 30 may be attached to the panel 10 in a manner less limiting deformation flexibility thereof. Also, the joint member 70 may be adhesive having a non-thermosetting property, which offers an advantage that thermal stress contraction is not likely to occur between the piezoelectric element 30 and the panel 10 when the joint member 70 sets. Or, the joint member 70 may be the double-sided tape, which offers an advantage that less contraction stress is caused than that when the adhesive is used between the piezoelectric element 30 and the panel 10.

Second Embodiment

Figure 5:
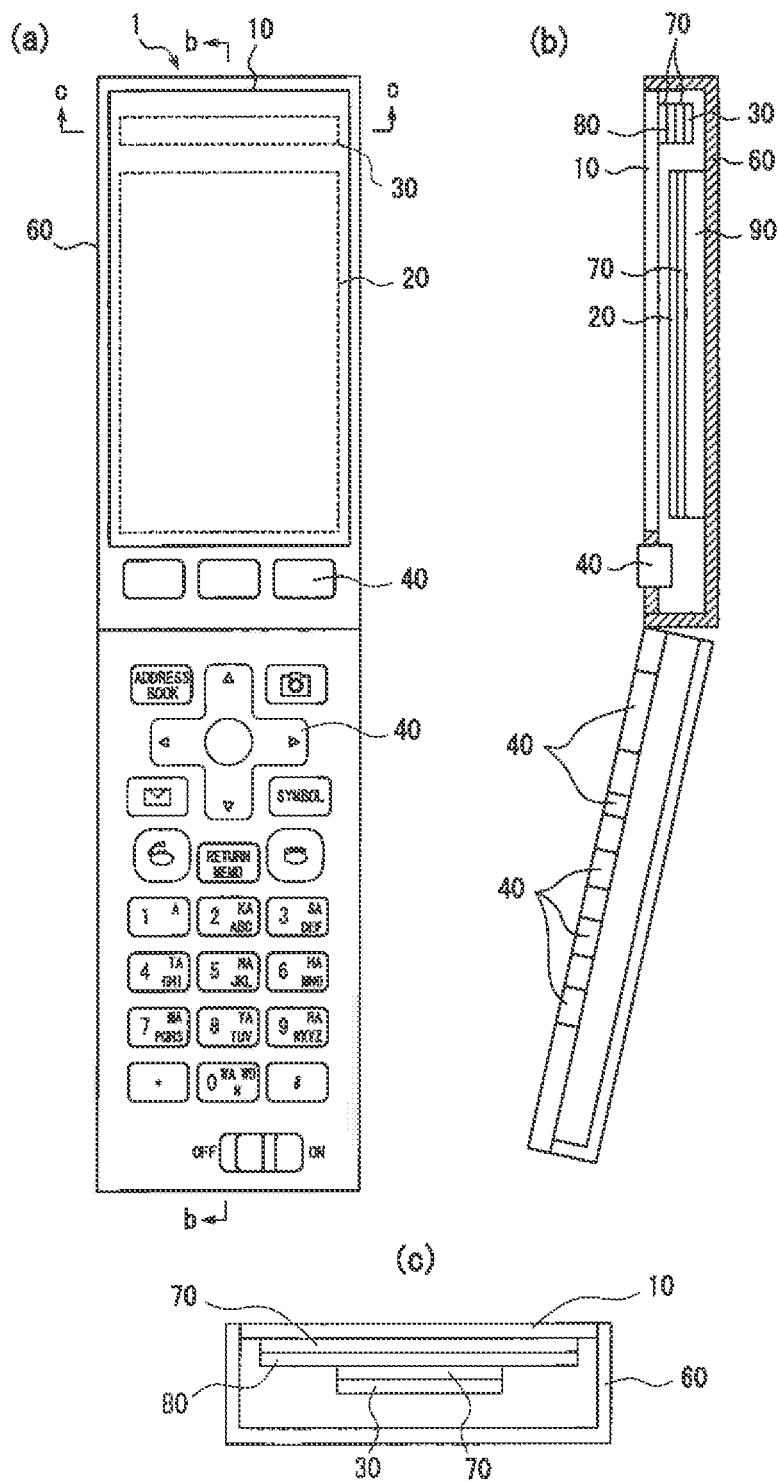
FIGS. 5(a) to 5(c) are diagrams illustrating a housing structure of the electronic device according to a second embodiment.

FIG. 5 illustrates diagrams of a housing structure of the electronic device 1 according to a second embodiment. FIG. 5(a) is a front view, FIG. 5(b) is a cross-sectional view taken from line b-b of FIG. 5(a), and FIG. 5(c) is a cross-sectional view taken from line c-c of FIG. 5(a). The electronic device 1 illustrated in FIG. 5 is a folding mobile phone having the cover panel (acrylic panel) for protecting the display unit 20 and serving as the panel 10 disposed on the front face of the housing 60 on the upper side thereof. According to the second embodiment, a reinforcement member 80 is disposed between the panel 10 and the piezoelectric element 30. The reinforcement member 80 is, for example, a resin plate including a sheet metal or glass fiber. That is, the electronic device 1 according to the second embodiment includes the piezoelectric element 30 and the reinforcement member 80 attached to each other by the joint member 70 and the reinforcement member 80 and the panel 10 attached to each other also by the joint member 70.

According to the second embodiment, also, the display unit 20 is not attached to the panel 10 but supported by the housing 60. That is, in the electronic device 1 according to the present embodiment, the display unit 20 is separated from the panel 10, and the display unit 20 and a support 90 serving as a part of the housing 60 are attached to each other by the joint member 70. The support 90 does not need to be a part of the housing 60 but may be a metallic or resin member independent of the housing 60. The input unit 40 serving as the operation key is provided to the housing 60.

Figure 6:
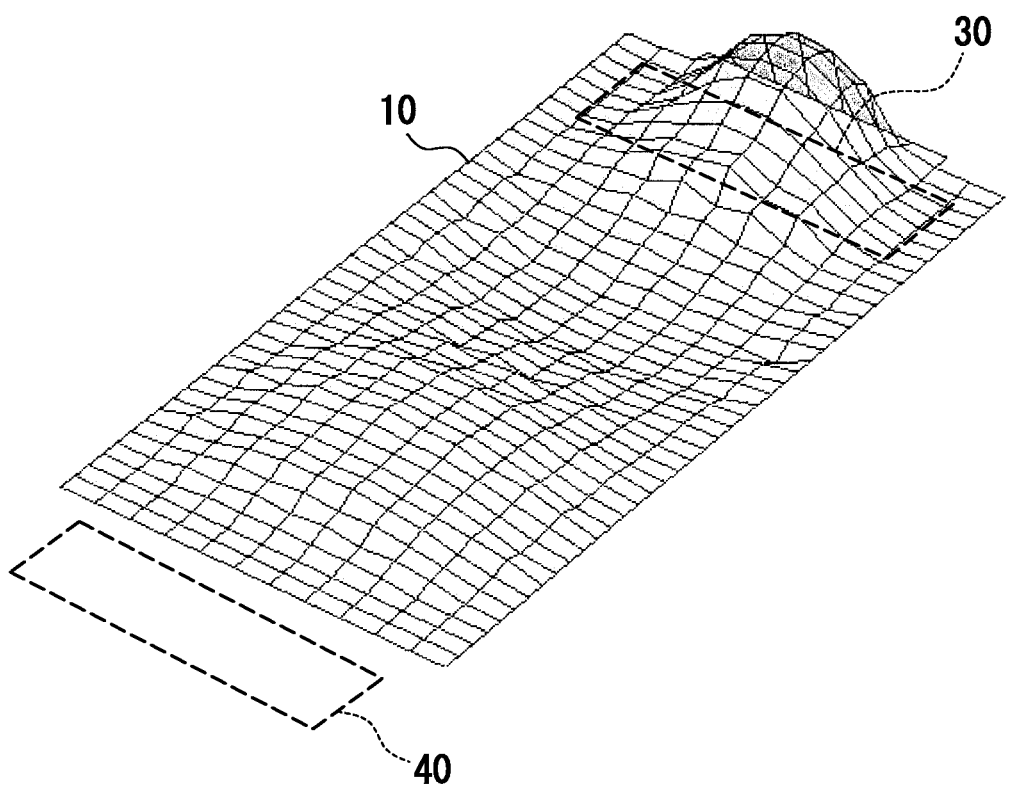
FIG. 6 is a diagram illustrating an example of vibration of the panel of the electronic device according to the second embodiment.

FIG. 6 is a diagram illustrating an example of vibration of the panel 10 of the electronic device 1 according to the second embodiment. In the electronic device 1 according to the second embodiment, the panel 10 is constituted by using an acrylic plate having less rigidity than the glass plate. Since the display unit 20 is not attached to the rear face of the panel 10, amplitude generated by the piezoelectric element 20 is larger than that of the electronic device 1 according to the first embodiment illustrated in FIG. 4. Also, both of the attachment area of the panel 10 having the piezoelectric element 30 attached thereto and the area separated from the attachment area are vibrated. Therefore, the user may hear, as well as the air conduction sound transmitted through the air, the human body vibration sound by contacting the user's ear to any portion of the panel 10. Also, since the operation key is provided to the housing 60, the vibration of the panel 10 is not likely to be transmitted to the operation key.

According to the electronic device 1 of the present embodiment, as described above, the reinforcement member 80 and the panel 10 are deformed due to deformation of the piezoelectric element 30 attached to the panel 10 by using the reinforcement member 80, thereby the air conduction sound and the human body vibration sound are transmitted to the object in contact with the panel 10 being deformed. Accordingly, the air conduction sound and the human body vibration sound may be transmitted to the user without the necessity of holding the vibrator against the user's ear. Also, the piezoelectric element 30 is attached to the inner surface of the housing 60 of the panel 10. Therefore, the air conduction sound and the human body vibration sound may be transmitted to the user without the necessity of protruding the vibrator to the external surface of the housing 60. Also, the panel 10 deforms, as well as in the attachment area having the piezoelectric element 30 attached thereto, at any portion thereof for transmitting the air conduction sound and the human body vibration sound. Accordingly, the user may hear, in addition to the air conduction sound transmitted through the air, the human body vibration sound by contacting the user's ear to any portion of the panel 11.

Since the reinforcement member 80 is disposed between the piezoelectric element 30 and the panel 10, when an external force is applied on the panel 10, for example, there is a less possibility for the external force to be transmitted to the piezoelectric element 30 and damage the piezoelectric element 30. Also, when the panel 10 is pressed against the human body, the vibration of the panel 10 becomes less attenuated. Further, since the reinforcement member 80 is disposed between the piezoelectric element 30 and the panel 10, a resonance frequency of the panel 10 becomes low and an acoustic property in a low frequency band is improved. Note that, instead of the reinforcement member 80, a plate-shaped anchor may be attached to the piezoelectric element 30 by using the joint member 70.

Although embodiments are described based on the figures, it is to be understood that those who are skilled in the art may easily vary or alter in a multiple manner based on disclosure of these embodiments. Accordingly, such variation and alteration are included in a scope of the present invention. For example, each member and each function and the like included in each step may be rearranged avoiding a logical inconsistency, so as to combine a plurality of components or steps, or to divide them.

Figure 7:
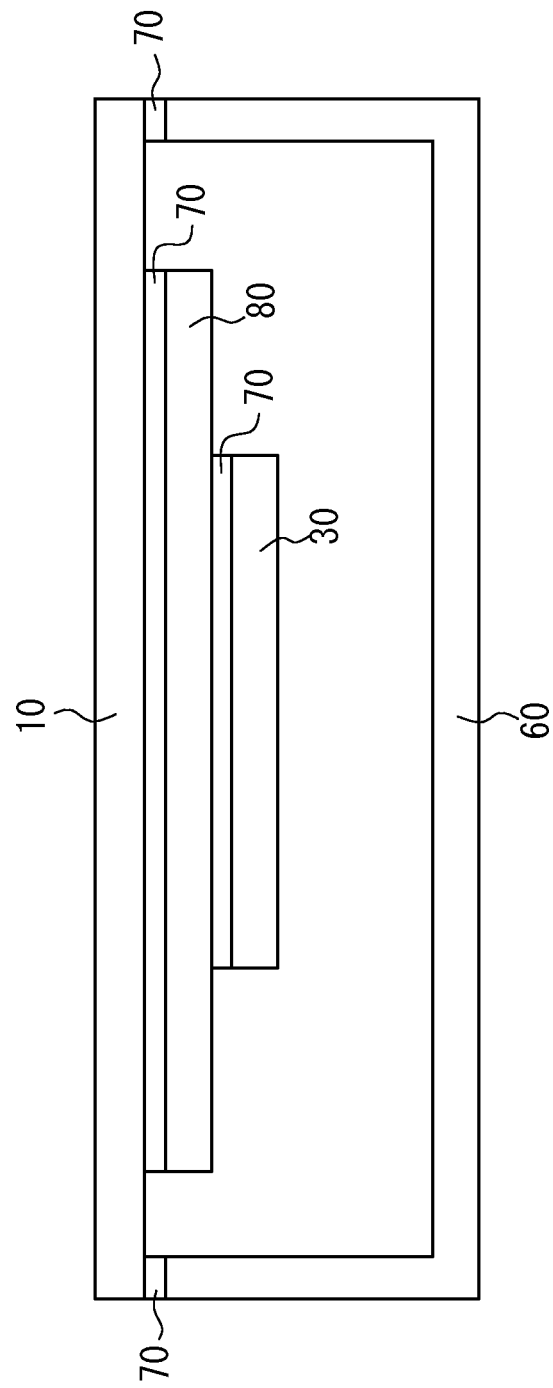
FIG. 7 is a diagram illustrating an example of joint of the panel and a housing.

As illustrated in FIG. 7, for example, the panel 10 may be joined to the housing 60 by the joint member 70. When direct transmission of the vibration from the panel 10 to the housing 60 is suppressed in this manner, a risk for the user to drop the electronic device 1 may be reduced in comparison to when the housing itself vibrates strongly. Also, the joint member 70 may be adhesive having the non-thermosetting property, which offers an advantage that thermal stress contraction is not likely occur between the housing 60 and the panel 10 when the joint member 70 sets. Further, the joint member 70 may be the double-sided tape, which offers an advantage that contraction stress is not likely caused unlike when using the adhesive between the housing 60 and the panel 10.

For example, when the panel 10 and the display unit 20 do not overlap with each other, the piezoelectric element 30 may be disposed at a center of the panel 10. When the piezoelectric element 30 is disposed at the center of the panel 10, the vibration of the piezoelectric element 30 evenly reaches the entire panel 10, thus quality of the air conduction sound may be improved and the human body vibration sound may be perceived by the user when the user contacts the ear to various portions of the panel 10. Also, in a similar manner to the above embodiments, a plurality of piezoelectric elements 30 may be attached.

According to the electronic device 1 described above, although the piezoelectric element 30 is attached to the panel 10, the piezoelectric element 30 may be attached to somewhere else. For example, the piezoelectric element 30 may be attached to a battery lid provided to the housing 60 for covering a battery. Since the battery lid is often provided on a plane of the electronic device 1 such as the mobile phone and the like different from the plane where the panel 10 is attached, such a configuration allows the user to hear the sound by contacting a part of the body (for example, the ear) to the plane different from the plane where the panel 10 is attached.

Also, the panel 10 may constitute any of or all of a display panel, an operation panel, the cover panel, a lid panel for allowing removal of a rechargeable battery. When the panel 10 constitutes the display panel, the piezoelectric element 30 is disposed outside a display area for performing a display function. Such an arrangement offers an advantage to diminish disturbance of a display. The operation panel includes the touch panel according to the first embodiment. Or, the operation panel includes sheet keys serving as members constituting one plane of the housing of, for example, the folding mobile phone having the operation unit where key tops of the operation keys are integrally formed.

Note that, according to the first and second embodiments, both of the joint member for attaching the panel 10 and the piezoelectric element 30 to each other and the joint member for attaching the panel 10 and the housing 60 are referred to as the joint member 70. However, different joint members may be used appropriately in the first and second embodiments based on members to be attached.

EXPLANATION OF REFERENCE NUMERALS

1 Electronic device
10 Panel
20 Display unit
30 Piezoelectric element
40 Input unit
50 Control unit
60 Housing
70 Joint member
80 Reinforcement member
90 Support

What is claimed is:

1. An electronic device comprising:
a piezoelectric element;
a vibration plate having the piezoelectric element fixed thereto for generating sound by vibrating a part of a human body as vibrated by the piezoelectric element;
a housing having the vibration plate fixed thereto; and
an operation key provided to the housing, wherein
the piezoelectric element is fixed closer to a first end of the vibration plate in a planar view,
the operation key is provided closer to a second end of the housing, opposite to the first end of the vibration plate in the planar view,
the vibration plate is configured to come in contact with a human body, and
the piezoelectric element includes first and second opposing major surfaces with piezoelectric material therebetween, said first major surface of the piezoelectric element opposing a rear face of the vibration plate and attached to a joint member that fixes the piezoelectric element to the opposing rear face of the vibration plate to directly vibrate the vibration plate.

2. The electronic device according to claim 1, further comprising:
a display unit fixed in an area between the piezoelectric element fixed to the vibration plate and the second end.

3. The electronic device according to claim 2, wherein
the piezoelectric element is fixed to the vibration plate at a position outside an area of the vibration plate overlapping with the display unit in the planar view.

4. The electronic device according to claim 1, wherein
the operation key is inserted into an opening provided to the housing.

5. An electronic device comprising:
a piezoelectric element;
a vibration plate having the piezoelectric element fixed thereto for generating sound by vibrating a part of a human body as vibrated by the piezoelectric element;
a housing having the vibration plate fixed thereto; and
an operation key provided to the housing, wherein
a length of the vibration plate in a second direction from a side where the piezoelectric element is fixed to the vibration plate in a planar view of the vibration plate to the other side is equal to or longer than a length between an antitragus and an inferior antihelix crus of an ear,
the vibration plate is configured to come in contact with a human body, and
the piezoelectric element includes first and second opposing major surfaces with piezoelectric material therebetween, said first major surface of the piezoelectric element opposing a rear face of the vibration plate and attached to a joint member that fixes the piezoelectric element to the opposing rear face of the vibration plate to directly vibrate the vibration plate.

6. An electronic device comprising:
a piezoelectric element;
a vibration plate having the piezoelectric element fixed thereto for generating sound by vibrating a part of a human body as vibrated by the piezoelectric element;
a housing having the vibration plate fixed thereto; and
an operation key provided to the housing, wherein
a length of the vibration plate in a direction crossing a second direction from a side where the piezoelectric element is fixed to the vibration plate to the other side of the vibration plate in a planar view of the vibration plate is equal to or longer than a length between a tragus and an antihelix of an ear,
the vibration plate is configured to come in contact with a human body, and
the piezoelectric element includes first and second opposing major surfaces with piezoelectric material therebetween, said first major surface of the piezoelectric element opposing a rear face of the vibration plate and attached to a joint member that fixes the piezoelectric element to the opposing rear face of the vibration plate to directly vibrate the vibration plate.

7. The electronic device according to claim 1, wherein the piezoelectric element is attached and fixed to the vibration plate by using a joint member.

8. The electronic device according to claim 7, wherein the joint member is non-heating type hardening adhesive.

9. The electronic device according to claim 7, wherein the joint member is a double-sided tape.

10. The electronic device according to claim 1, wherein the vibration plate is attached to the housing by using a joint member.

11. The electronic device according to claim 10, wherein the joint member is the non-heating type hardening adhesive.

12. The electronic device according to claim 10, wherein the joint member is the double-sided tape.

13. The electronic device according to claim 1, wherein the vibration plate constitute any of or all of the display unit, an input unit, a display unit cover and a battery cover for allowing removal of a battery.

14. The electronic device according to claim 1, wherein the vibration plate further generates air-conducted sound.

\* \* \* \* \*